Feb. 4, 1936.　　　G. L. R. J. MESSIER　　　2,029,829
SYSTEM FOR ENSURING FLUID-TIGHTNESS FOR HORIZONTAL HYDRAULIC CYLINDERS
Original Filed May 6, 1933
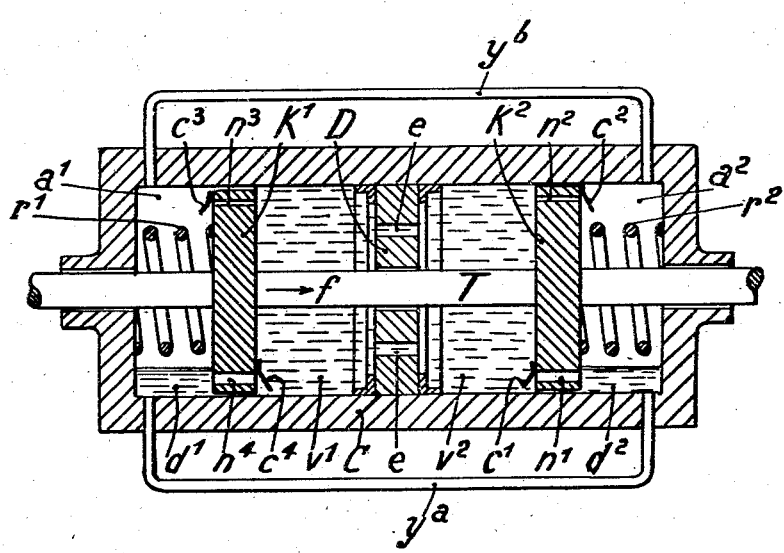
Inventor
GEORGE LOUIS RENÉ JEAN MESSIER,
DECEASED,
By - YVONNE LUCIE MESSIER, BORN BONNAMY,
ADMINISTRATRIX,
By Marks † Clerk
Attys.

Patented Feb. 4, 1936

2,029,829

UNITED STATES PATENT OFFICE 2,029,829

SYSTEM FOR ENSURING FLUID-TIGHTNESS FOR HORIZONTAL HYDRAULIC CYLINDERS

George Louis René Jean Messier, deceased, late of Paris, France, by Yvonne Lucie Messier, born Bonnamy, administratrix, Paris, France, Original application May 6, 1933, Serial No. 669,771. Divided and this application March 15, 1934, Serial No. 715,767. In France May 10, 1932

4 Claims. (Cl. 188—98)

This application is a division of the patent application filed on the 6th May, 1933, under Serial No. 669,771, for "Devices for ensuring the rational suspension of railroad vehicles", in the name of the applicant.

The present invention has for its object a device for ensuring fluid-tightness and is applicable to horizontal hydraulic cylinders.

The said invention is particularly applicable to cylinders operating as shock absorbers, by passage of a liquid through orifices of narrow cross section.

In devices of this type, it is difficult to permanently maintain a sufficient fluid-tightness between the cylinder and the rod carrying the piston, or the diaphragm, which moves in this cylinder. When, as is frequently the case, this rod is exposed to the action of external agents, the linings used for ensuring fluid-tightness, in particular stuffing-boxes frequently employed, are rapidly damaged and put out of use.

By means of the present invention, absolute fluid-tightness between the hydraulic cylinder and the piston rod is rendered unnecessary.

The single figure of the accompanying drawing is an axial section showing the construction of a hydraulic cylinder according to the invention.

A rod $T$, on which are keyed two pistons $K^1$ and $K^2$, is movable in the cylinder or casing $C$.

It is not obligatory that the cylinder $C$ is fixedly mounted. In some cases, this cylinder is fixed i. e. rigid with the chassis of a vehicle (not shown) when it is desired to dampen the lateral oscillations; the rod $T$ of the pistons is then connected to an axle of the vehicle. In other cases, the arrangement is reversed, i. e. the rod $T$ is connected to the chassis and the cylinder $C$ to the axle. It must however be borne in mind that this idea of fixity is absolutely relative in the case of a vehicle running on a railroad.

When the invention is applied to the type of shock absorber indicated above, these pistons $K^1$ and $K^2$ are arranged on either side of a diaphragm $D$, which is rigid with the cylinder $C$ and is provided with orifices $e$ having a narrow cross section.

In principle, the pistons $K^1$ and $K^2$ slide in a fluid-tight manner in the cylinder $C$. The system or arrangement has for its essential object to substitute the fluid-tightness for the passage of the rod $T$ in the cylinder—a fluid tightness which is very difficult to establish and above all to maintain—a perfect fluid tightness due to the pistons $K^1$ and $K^2$ themselves.

Optionally, springs $r^1$, $r^2$ hold the rod $T$ in the position of rest and the cylinder $C$ in a relative mean position.

The space comprised, within the cylinder, between said pistons, is filled with liquid, oil for instance.

As in the known devices, the passage of this liquid through the narrow orifices $e$,—when the rod $T$ and the cylinder $D$ receive a relative displacement,—has the effect of checking and damping these displacements or the side shocks received by the cylinder or by the rod.

According to the constructional form as shown in the drawing, the stuffing boxes, which are usually mounted where the rod $T$ passes through the opposite covers of the cylinder $C$, are eliminated and the fluid-tightness is ensured by the pistons $K^1$ $K^2$ themselves.

Leakage can however occur, after a long time of use, by the liquid passing in the outer compartments $a^1$—$a^2$.

The present invention has for its object to recover the liquid thus evacuated.

For the purpose of recovering the liquid thus evacuated, orifices $n^1$ $n^2$ $n^3$ $n^4$ are provided in each of the pistons $K^1$ and $K^2$. Opposite each of the lower orifices $n^1$ and $n^4$, flap valves $c^1$ $c^4$ are mounted on the inner face of the respective pistons $K^2$ and $K^1$, the said valves opening toward the center of the cylinder. Opposite the upper orifices $n^2$ and $n^3$, flap valves $c^2$ $c^3$ are mounted on the opposite face of the respective pistons, the said valves opening toward the exterior of these pistons. The orifices $n^2$ and $n^3$ are of small cross section relatively to the corresponding orifices $n^1$ and $n^4$.

When the rod $T$, carrying the pistons, moves in the direction of the arrow $f$, a partial vacuum is produced in the space $v^2$, so that, the valve $c^1$ lifting, the liquid which may have accumulated at $d^2$ (at the base of the compartment $a^2$) flows back, through the orifice $n^1$, into the space $v^2$, the valve $c^2$ remaining closed.

During the same movement, the piston $K^1$ compresses liquid in the compartment $v^1$, forcing it to pass through the orifices $e$ of the diaphragm $D$, this producing the desired hydraulic checking action.

At the same time, the valve $c^3$ being open, a small quantity of liquid escapes from the compartment $v^1$ and accumulates at $d^1$ in the compartment $a^1$.

If, for any cause whatever, a certain quantity of air had been introduced in the compartment $v^1$, it is evacuated at the same time as this liquid. The latter, upon reverse movement of the piston, is recovered through the orifice $n^4$, the valve $c^4$ being then open.

A communication $y^a$, $y^b$ can be provided between $a^1$ and $a^2$ for equalizing at $d^1$ and $d^2$ the levels of the liquid.

What is claimed and desired to be secured by Letters Patent is:—

1. A fluid-tight hydraulic device capable of operating as a shock absorber, comprising: a cylinder, a rod passing through this cylinder, two pistons rigid with said rod and having a sliding fit relative to the cylinder to ensure of fluid tightness therebetween, a liquid filling the cylinder between the pistons, a first series of orifices passing through each of said pistons at their lower portion, a second series of orifices passing through each of the said pistons at their upper portion, a flap valve on the inner face of each piston opening toward the center of the cylinder opposite each of the lower orifices, and a flap valve on the outer face of each piston opening away from the center of the cylinder opposite each of the upper orifices.

2. A fluid-tight hydraulic device capable of operating as a shock absorber, comprising: a cylinder, a rod passing through this cylinder, two pistons rigid with said rod and having a sliding fit relative to the cylinder to ensure of fluid tightness therebetween, a liquid filling the cylinder between the pistons, a first series of orifices passing through each of said pistons at their lower portion, a second series of orifices passing through each of the said pistons at their upper portion, a flap valve on the inner face of each piston opening toward the center of the cylinder opposite each of the lower orifices, and a flap valve on the outer face of each piston opening away from the center of the cylinder opposite each of the upper orifices, a communication between the two compartments of the cylinder which are on the external side of the pistons.

3. A fluid-tight hydraulic device capable of operating as a shock absorber, comprising: a cylinder, a rod passing through this cylinder, two pistons rigid with said rod and having a sliding fit relative to the cylinder to ensure of fluid tightness therebetween, a liquid filling the cylinder between the pistons, a diaphragm rigid with the cylinder and arranged between the pistons, narrow orifices provided in this diaphragm, a first series of orifices passing through each of said pistons at their lower portion, a second series of orifices passing through each of the said pistons at their upper portion, a flap valve on the inner face of each piston opening toward the center of the cylinder opposite each of the lower orifices, and a flap valve on the outer face of each piston opening away from the center of the cylinder opposite each of the upper orifices.

4. A fluid-tight hydraulic device capable of operating as a shock absorber, comprising: a cylinder, a rod passing through this cylinder, two pistons rigid with said rod and having a sliding fit relative to the cylinder to ensure of fluid tightness therebetween, a liquid filling the cylinder between the pistons, a diaphragm rigid with the cylinder and arranged between the pistons, narrow orifices provided in this diaphragm, a first series of orifices passing through each of said pistons at their lower portion, a second series of orifices passing through each of the said pistons at their upper portion, a flap valve on the inner face of each piston opening toward the center of the cylinder opposite each of the lower orifices, and a flap valve on the outer face of each piston opening away from the center of the cylinder opposite each of the upper orifices, a communication between the two compartments of the cylinder which are on the external side of the pistons.

YVONNE LUCIE MESSIER,
BORN BONNAMY,
*Administratrix of the Estate of George L. R. J. Messier, Deceased.*